United States Patent
Arai et al.

(10) Patent No.: US 8,330,799 B2
(45) Date of Patent: Dec. 11, 2012

(54) IMAGE OUTPUT APPARATUS AND IMAGE OUTPUT METHOD

(75) Inventors: Takayuki Arai, Hamura (JP); Tatsuya Ono, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/218,176

(22) Filed: Aug. 25, 2011

(65) Prior Publication Data

US 2012/0050472 A1    Mar. 1, 2012

(30) Foreign Application Priority Data

Aug. 26, 2010  (JP) .................................. 2010-189844

(51) Int. Cl.
  *H04N 13/00* (2006.01)
  *G06K 9/00* (2006.01)
(52) U.S. Cl. ......................................... 348/43; 382/154
(58) Field of Classification Search .............. 348/42–60; 382/167, 175, 117, 118
  See application file for complete search history.

(56) References Cited

FOREIGN PATENT DOCUMENTS

| JP | 11-191895 | 7/1999 |
|---|---|---|
| JP | 2000-134642 | 5/2000 |
| JP | 2003-319417 | 11/2003 |
| JP | 2005-184377 | 7/2005 |
| JP | 2006-121553 | 5/2006 |

OTHER PUBLICATIONS

Japanese Application No. 2010-189844 Office Action (Dec. 13, 2011) (English translation attached).

*Primary Examiner* — Behrooz Senfi
(74) *Attorney, Agent, or Firm* — Patterson & Sheridan, LLP

(57) ABSTRACT

According to one embodiment, an image output apparatus includes an input module, a separator, a first image processor, a second image processor, and a controller. The input module is configured to input 3D images. The separator is configured to separate a plurality of left-eye images and a plurality of right-eye images from the 3D images. The first image processor is configured to process the plurality of left-eye images or the plurality of right-eye images. The second image processor is configured to process the plurality of right-eye images or the plurality of left-eye images. The controller is configured to execute control to output the plurality of left-eye images or the plurality of right-eye images processed by at least one of the first image processor and the second image processor.

8 Claims, 4 Drawing Sheets

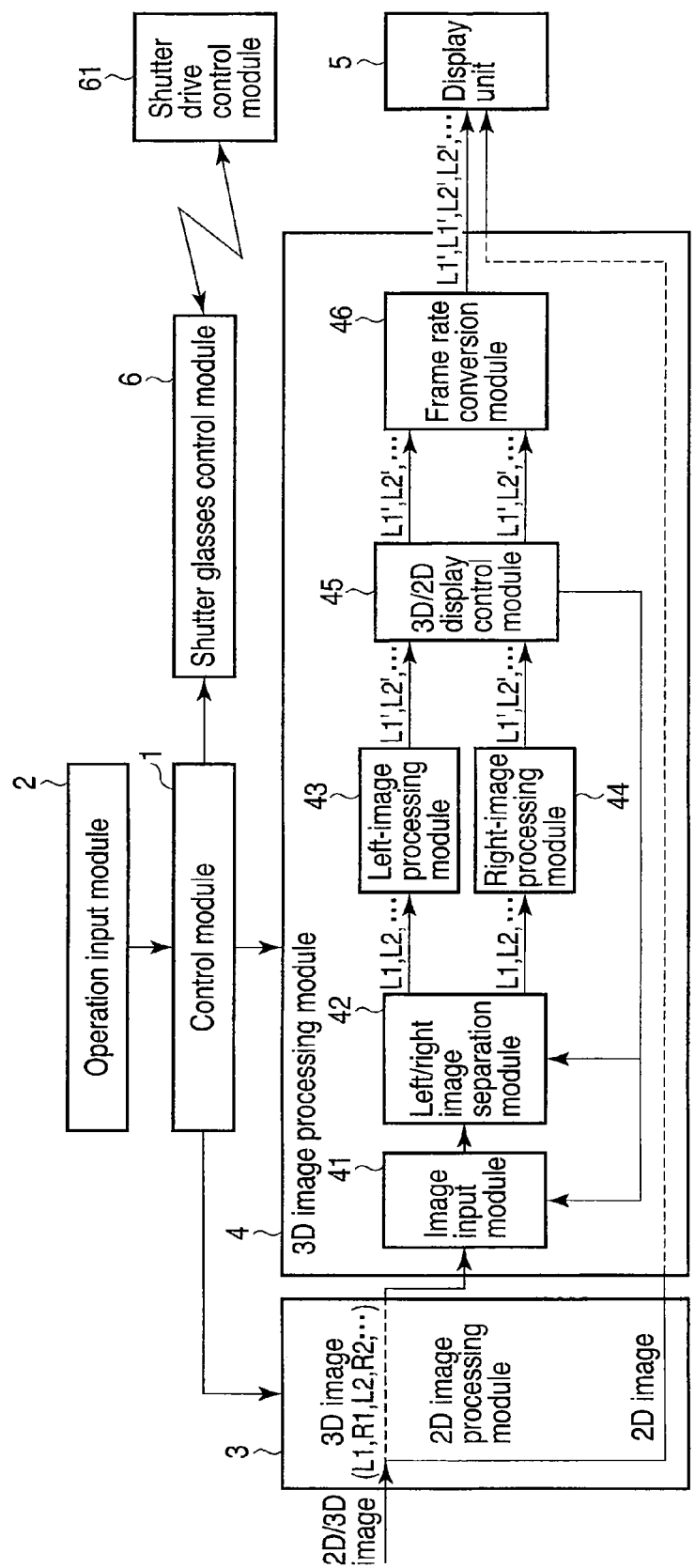
F I G. 2

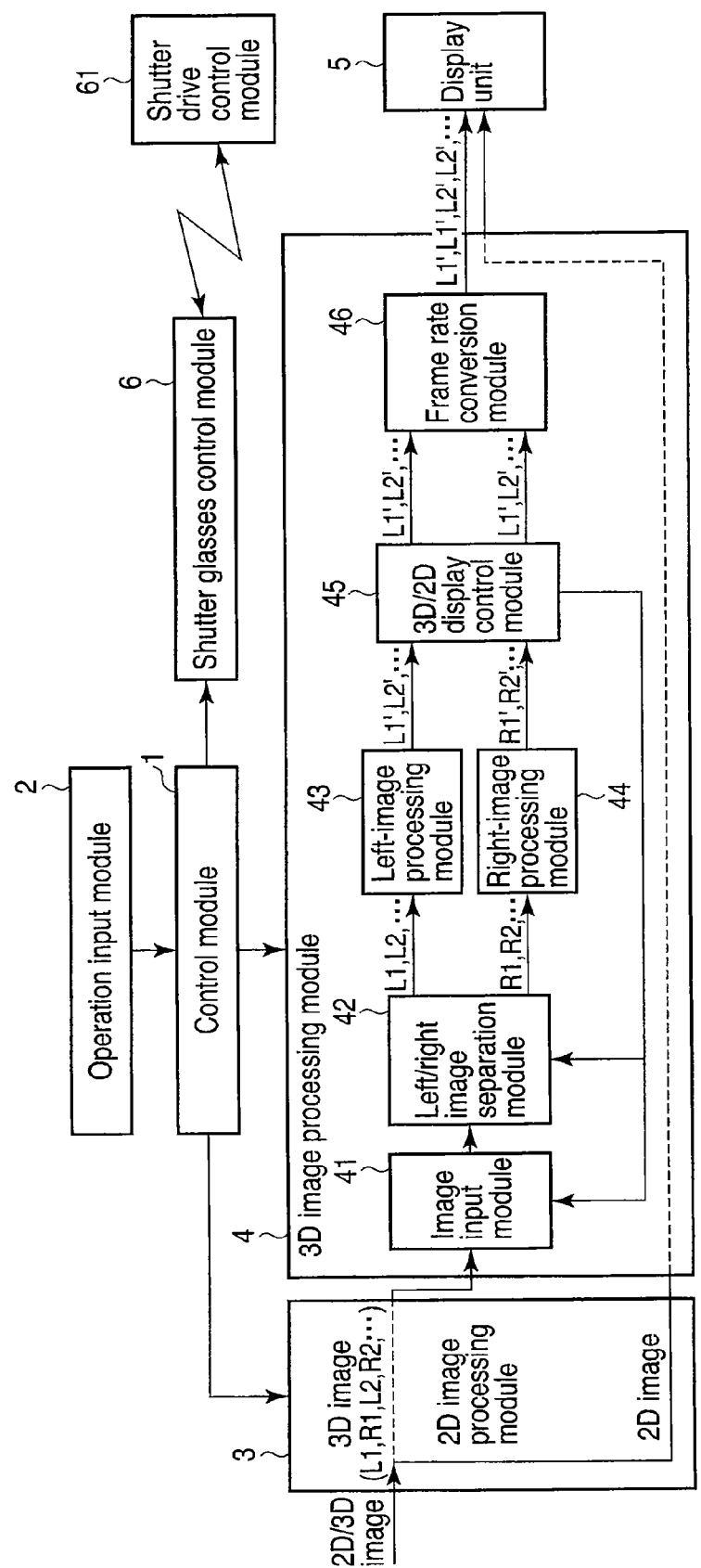
F I G. 3

IMAGE OUTPUT APPARATUS AND IMAGE OUTPUT METHOD

CROSS-REFERENCE TO RELATED APPLICATIONS

This application is based upon and claims the benefit of priority from Japanese Patent Application No. 2010-189844, filed Aug. 26, 2010; the entire contents of which are incorporated herein by reference.

FIELD

Embodiments described herein relate generally to an image output apparatus and image output method.

BACKGROUND

Various techniques required to display three-dimensional (3D) images have been disclosed so far, and have been put into practical applications. However, since, for example, the brightness and resolution of 3D images are inferior to those of two-dimensional (2D) images, 3D image-compatible devices such as 3D televisions have not prevailed.

However, in recent years, the advent of large-capacity optical discs such as Blu-ray® Discs (BDs) and the prevalence of full-high-definition (full-HD) televisions allow to play back high-quality 3D images. For this reason, it is expected that 3D image-compatible devices will prevail rapidly.

A 3D image-compatible device not only can display 3D images as the 3D images intact, but also can convert 3D images into 2D images and display them as the 2D images.

However, when 3D images are converted into 2D images and the 2D images are displayed, image quality often deteriorates. In recent years, the image quality enhancement technique of 2D images has been greatly advanced, and a demand has arisen for application of such image quality enhancement technique to 3D images as well.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an example of image output processing (2D image output processing based on input 3D images) according to the second embodiment;

FIG. 3 is a block diagram showing an example of image output processing (2D image output processing based on input 3D images) according to the third embodiment.

DETAILED DESCRIPTION

Various embodiments will be described hereinafter with reference to the accompanying drawings.

In general, according to one embodiment, an image output apparatus includes an input module, a separator, a first image processor, a second image processor, and a controller. The input module is configured to input 3D images. The separator is configured to separate a plurality of left-eye images and a plurality of right-eye images from the 3D images. The first image processor is configured to process the plurality of left-eye images or the plurality of right-eye images. The second image processor is configured to process the plurality of right-eye images or the plurality of left-eye images. The controller is configured to execute control to output the plurality of left-eye images or the plurality of right-eye images processed by at least one of the first image processor and the second image processor.

The first to fourth embodiments will be described hereinafter with reference to the drawings.

Figure 1:
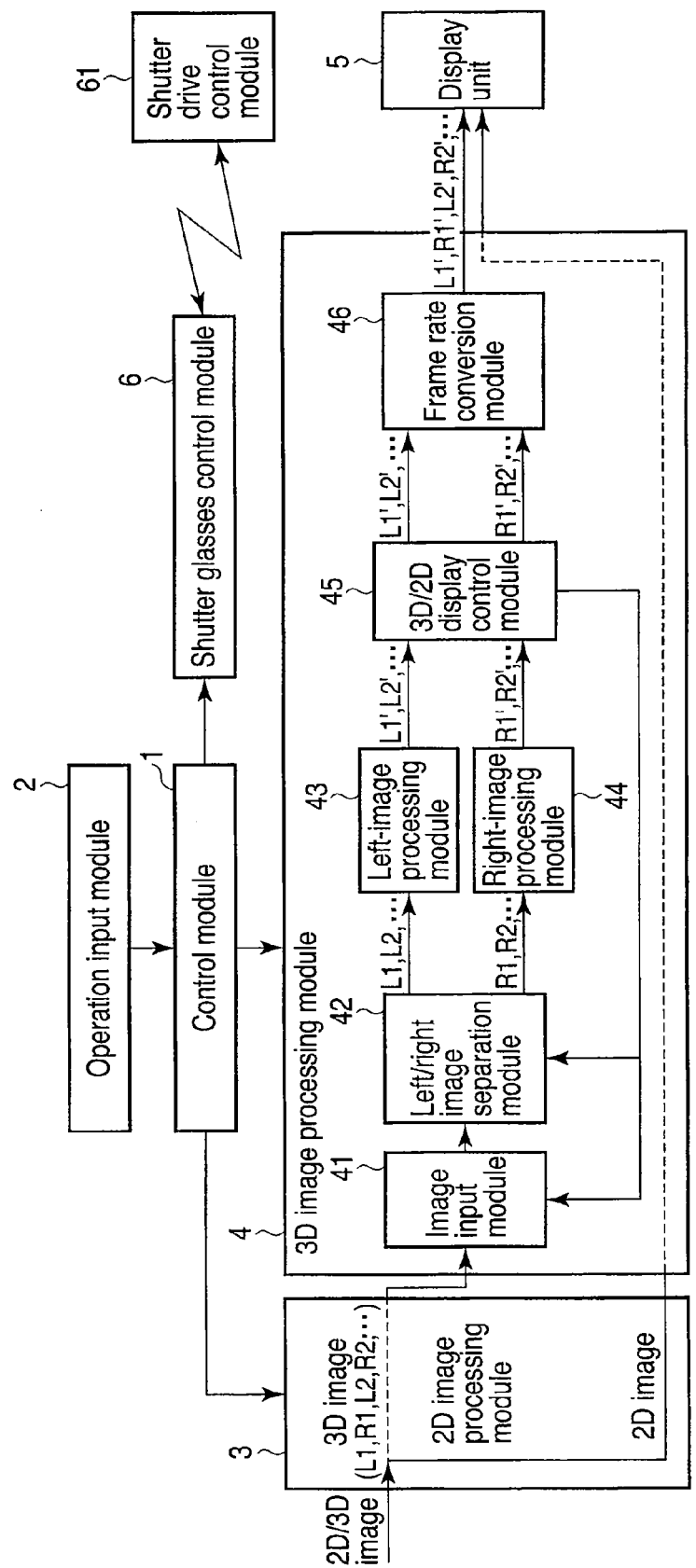
FIG. 1 is a block diagram showing an example of the arrangement of an image output apparatus according to the first to fourth embodiments.

FIG. 1 is a block diagram showing an example of the arrangement of an image output apparatus according to the first to fourth embodiments. This image output apparatus is applicable to, for example, a digital television broadcast receiver, and to a program recorder such as an HDD recorder, Blu-ray® Disc (BD) recorder, and DVD recorder. Furthermore, this image output apparatus is applicable to various players such as a BD player and DVD player.

As shown in FIG. 1, the image output apparatus includes a control module 1, operation input module 2, 2D image processing module 3, 3D image processing module 4, display unit 5, and shutter glasses control module 6. Furthermore, the 3D image processing module 4 includes an image input module 41, left/right image separation module 42, left-image processing module 43, right-image processing module 44, 3D/2D display control module 45, and frame-rate conversion module 46.

The control module 1 controls 2D image output processing based on input 2D images, 3D image output processing based on input 3D images, and 2D image output processing based on input 3D images. The operation input module 2 is, for example, a fixed operation panel or a remote controller.

For example, when 2D images are input, the control module 1 controls the 2D image processing module 3 to process the input 2D images. The 2D image processing module 3 applies various kinds of image quality enhancement processing to the input 2D images, and outputs the 2D images to the display unit 5. For example, the 2D image processing module 3 applies super-resolution processing, gamma correction, dithering, multi-tone conversion processing, scaling processing, and also frame-rate conversion processing to the input 2D images. Thus, the display unit 5 can display the 2D images which have undergone the image quality enhancement processing and also those which have undergone the frame-rate conversion processing based on the input 2D images.

When 3D images are input, and a 3D image mode is designated via the operation input module 2, the control module 1 controls the 3D image processing module 4 to process the input 3D images and to display the 3D images. The 3D image processing module 4 applies various kinds of image quality enhancement processing to the input 3D images, and outputs the 3D images to the display unit 5. For example, the 3D image processing module 4 applies super-resolution processing, gamma correction, dithering, multi-tone conversion processing, scaling processing, and also frame-rate conversion processing to a plurality of left-eye images and a plurality of right-eye images separated from the input 3D images. Thus, the display unit 5 can display the 3D images which have undergone the image quality enhancement processing and also those which have undergone the frame-rate conversion processing based on the input 3D images.

The 3D image processing by the 3D image processing module 4 will be described in more detail below. The 3D image processing module 4 supports various 3D transfer formats (top-and-bottom, side-by-side, frame sequential, frame packing, and frame alternate). For example, as shown in FIG. 1, the left/right image separation module 42 separates, from input 3D images (L1, R1, L2, R2, ...), a plurality of left-eye images (L1, L2, ...) and a plurality of right-eye images (R1, R2, ...), inputs the plurality of left-eye images to the left-image processing module 43, and inputs the plurality of right-eye images to the right-image processing module 44. The left-image processing module 43 applies the image quality enhancement processing to the plurality of left-eye images, and inputs a plurality of left-eye images (L1', L2', ...) that have undergone the image quality enhancement processing to the 3D/2D display control module 45. Likewise, the right-image processing module 44 applies the image quality enhancement processing to the plurality of right-eye images, and inputs a plurality of right-eye images (R1', R2', ...) that have undergone the image quality enhancement processing to the 3D/2D display control module 45.

The 3D/2D display control module 45 alternately outputs, one by one, the plurality of left-eye images that have undergone the image quality enhancement processing and the plurality of right-eye images that have undergone the image quality enhancement processing (L1', R1', L2', R2', ...). Alternatively, the 3D/2D display control module 45 may alternatively output every two of these images (L1', L2', R1', R2', ...). Also, the frame-rate conversion module 46 can increase the frame rate, and can alternately output, one by one, the plurality of left-eye images that have undergone the image quality enhancement processing and the plurality of right-eye images that have undergone the image quality enhancement processing. For example, the frame-rate conversion module 46 increases the number of frames to be output per predetermined time period by frame interpolation, to convert, for example, a first frame rate (60 Hz) into a second frame rate (120 or 240 Hz), thus outputting the images. For example, the frame-rate conversion module 46 generates a plurality of frame-interpolated left-eye images based on the plurality of left-eye images, and generates a plurality of frame-interpolated right-eye images based on the plurality of right-eye images, thus increasing the number of frames (for example, it changes the frame rate from 60 Hz to 120 Hz). Alternatively, the frame-rate conversion module 46 generates a plurality of frame-interpolated left-eye images based on the plurality of left-eye images, generates a plurality of frame-interpolated right-eye images based on the plurality of right-eye images, and further inserts black images (interpolation black images), thus increasing the number of frames (for example, it changes the frame rate from 60 Hz to 240 Hz).

The shutter glasses control module 6 sends sync signals synchronized with alternate output timings of left- and right-eye images to a shutter drive control module 61 for shutter glasses. Based on the sync signals, the shutter drive control module 61 opens a left-eye shutter and closes a right-eye shutter at left-eye image display timings, and opens the right-eye shutter and closes the left-eye shutter at right-eye image display timings. As a result, the user who wears the shutter glasses can view left-eye images at the left-eye image display timings and right-eye images at the right-eye image display timings, that is, he or she can view 3D images.

Note that when 3D images are input, and the 3D image mode is designated via the operation input module 2, the control module 1 controls the 2D image processing module 3 of the former stage to stop various kinds of image quality enhancement processing and controls the 3D image processing module 4 to execute various kinds of image quality enhancement processing. As described above, the 3D image processing module 4 executes various kinds of image quality enhancement processing independently for right- and left-eye images. For this reason, when the 3D image processing module 4 applies various kinds of image quality enhancement processing to 3D images, the image quality enhancement result of the 3D images is better than when the 2D image processing module 3 applies various kinds of image quality enhancement processing to 3D images. When the 2D image processing module 3 of the former stage executes various kinds of image quality enhancement processing, the left/right image separation module 42 of the latter stage often fails to correctly separate right- and left-eye images. In order to prevent such separation errors, it is effective to stop various kinds of image quality enhancement processing by the 2D image processing module 3 of the former stage and to execute them by the 3D image processing module 4 of the latter stage.

Sharpening processing (the super-resolution processing described above) as an example of various kinds of image quality enhancement processing will be added below. The 2D image processing module 3 and 3D image processing module 4 (L image processing module 43 and right-image processing module 44) implement the sharpening processing for restoring an image signal of a high resolution as a second resolution by estimating original pixel values from an image signal of a low resolution as a first resolution to increase the number of pixels. For example, in a side-by-side format (to transfer two images to right and left positions to attain a resolution of 1920×1080), each of right and left images has image quality of a low resolution of 810 (960)×1080, but the image quality of such image can be enhanced by the super-resolution processing. The aforementioned "original pixel values" mean values of respective pixels of an image signal when the same object as that when the image signal of the low resolution (first resolution) is obtained is captured by a camera of a high resolution (second resolution). Also, "increasing the number of pixels by estimation" includes various methods, but this means that, for example, a feature of a target image is captured to estimate original pixel values from images having high intra- or inter-frame correlations so as to obtain pixel values to be associated with new pixels. That is, image correlation is used.

More specifically, a tentative full-HD high-resolution image is generated from an original input image by up-convert processing. That is, based on pieces of information of neighboring pixels, middle pixel values are interpolated to generate a tentative full-HD high-resolution image. The interpolated pixels are not always those included in an original image. That is, noise components and disturbed edge components may be generated due to calculation errors.

Next, an image which is down-converted to the same resolution as the original image is generated from the tentative full-HD high-resolution image based on an image capture model function. The image capture model function simulates the same processing as conversion of a general camera from information on an image capturing element into an image signal by means of calculations.

The down-converted image should be the same as the original input image. However, different parts are generated between the down-converted image and original input image due to, for example, calculation errors in the up-convert processing. The different parts are detected, and the down-converted image is corrected to eliminate calculation errors with reference to, for example, information of surrounding pixels, thereby generating an output image which has undergone the super-resolution processing and is approximate to the original input image.

That is, the super-resolution processing is a technique which restores signal components to be originally included in the original input image by comparing the down-converted image and original input image. The precision of the super-resolution processing is further improved as the comparison and restoration processes are repeated a larger number of times. Therefore, processing in which the comparison and restoration processes are repeated once is the super-resolution processing, and processing in which the comparison and restoration processes are repeated a plurality of times is also the super-resolution processing. When there is enough time, for example, when recorded images are viewed later, the super-resolution processing which repeats the comparison and restoration processes a plurality of times can be used.

Note that the 2D image processing module 3 and 3D image processing module 4 (L image processing module 43 and right-image processing module 44) can also use known and public techniques disclosed in, for example, Jpn. Pat. Appln. KOKAI Publication Nos. 2007-310837, 2008-98803, and 2000-188680.

For example, when the super-resolution processing disclosed in Jpn. Pat. Appln. KOKAI Publication No. 2007-310837 is used, a plurality of corresponding points corresponding to a plurality of image regions of interest, which are closest to pixel value change patterns in image regions of interest including pixels of interest in a plurality of medium-resolution frames, are selected from a reference frame. Luminance sample values at the corresponding points are set as pixel values of the pixels of interest corresponding to the corresponding points, and pixel values of a high-resolution frame which includes pixels more than the reference frame and corresponds to the reference frame are calculated based on the magnitudes of the plurality of sample values and the layout of the plurality of corresponding points. Then, the number of pixels is increased by estimating original pixel values from a low-resolution image signal, thereby restoring a high-resolution image signal.

When the super-resolution processing, which is disclosed in Jpn. Pat. Appln. KOKAI Publication No. 2008-98803 and uses a self-congruent position search in a single frame image, is used, a first pixel position having a minimum error is calculated by comparing errors of respective pixels in a search region of a medium-resolution frame, and a position having a minimum error in the search region is calculated to have decimal precision based on the first pixel position and its first error, and a second pixel position around the first pixel and its second error. Then, a decimal precision vector having this position as an end point and a pixel of interest as a start point is calculated. Using this decimal precision vector, an extrapolation vector of the decimal precision vector, which has, as an end point, a pixel on the frame that is not included in the search region, is calculated. Then, pixel values of a high-resolution image including pixels more than those included in an image signal are calculated based on the decimal precision vector, extrapolation vector, and pixel values acquired from the image signals. A super-resolution image generation module restores a high-resolution image signal by estimating original pixel values from a low-resolution image signal to increase the number of pixels by executing such processing.

Also, the super-resolution processing, which is disclosed in Jpn. Pat. Appln. KOKAI Publication No. 2000-188680 and uses mapping between a plurality of frame images, can be used.

In the super-resolution processing in the 2D image processing module 3 and 3D image processing module 4 (L image processing module 43 and right-image processing module 44), image quality enhancement processing may be attained as follows. That is, a unique algorithm is applied to a blown-up image to temporarily convert it into a low-resolution image, and differences are detected by comparing that image and an original input image to further apply correction processing.

However, the super-resolution processing method in the 2D image processing module 3 and 3D image processing module 4 (L image processing module 43 and right-image processing module 44) is not limited to those described above, and any other methods can be applied as long as processing can restore a high-resolution image signal by estimating original pixel values from a low-resolution image signal to increase the number of pixels.

The description will revert to image display control of the control module 1. For example, when 3D images are input, and a 2D image mode is designated via the operation input module 2, the control module 1 controls the 3D image processing module 4 to process the input 3D images and to display 2D images. The 3D image processing module 4 applies various kinds of image quality enhancement processing to the input 3D images to convert the input 3D images into 2D images, and outputs the 2D images to the display unit 5. Alternatively, the 3D image processing module 4 applies various kinds of image quality enhancement processing to the input 3D images to convert the input 3D images into 2D images, then applies frame-rate conversion processing to the 2D images, and outputs the 2D images to the display unit 5. Then, the display unit 5 can display the 2D images which have undergone the image quality enhancement processing or those which have also undergone the frame-rate conversion processing based on the input 3D images.

The 2D image output (2D image display) processing based on input 3D images will be described hereinafter with reference to the first to fourth embodiments.

First Embodiment

The first embodiment will be described first. When 3D images are input and a 2D image mode is designated via the operation input module 2, the control module 1 controls the 2D image processing module 3 to stop various kinds of image quality enhancement processing, and controls the 3D image processing module 4 to process the input 3D images and to display 2D images.

For example, the 3D/2D display control module 45 instructs the left/right image separation module 42 to stop separation processing, and inputs the input 3D images as left-eye images to the left-image processing module 43. The left-image processing module 43 applies various kinds of image quality enhancement processing to the input 3D images, and outputs the processed images. The 3D/2D display control module 45 outputs a plurality of left-eye images included in the 3D images that have undergone various kinds of image quality enhancement processing to the frame-rate conversion module 46. The frame-rate conversion module 46 increases the number of frames to be output per predetermined time period by frame interpolation to convert, for example, a first frame rate (60 Hz) to a second frame rate (120 or 240 Hz), and outputs the converted images. For example, the frame-rate conversion module 46 generates a plurality of frame-interpolated images based on the plurality of left-eye images, thereby increasing the number of frames.

Note that the image output apparatus inputs the input 3D images as left-eye images to the left-image processing module 43 to output only the left-eye images in the above description. Alternatively, the image output apparatus may input the input 3D images as right-eye images to the right-image processing module 44 to output only the right-eye images.

Second Embodiment

The second embodiment will be described below with reference to FIG. 2. When 3D images are input and a 2D image mode is designated via the operation input module 2, the control module 1 controls the 2D image processing module 3 to stop various kinds of image quality enhancement processing, and controls the 3D image processing module 4 to process the input 3D images and to output 2D images.

For example, the 3D/2D display control module 45 instructs the left/right image separation module 42 to execute separation of right- and left-eye images. As shown in FIG. 2, the left/right image separation module 42 separates a plurality of left-eye images (L1, L2, . . . ) and a plurality of right-eye images (R1, R2, . . . ) from the input 3D images (L1, R1, L2, R2, . . . ), inputs the plurality of left-eye images (L1, L2, . . . ) to the left-image processing module 43, and also inputs the plurality of left-eye images (L1, L2, . . . ) to the right-image processing module 44. The left-image processing module 43 applies various kinds of image quality enhancement processing to the plurality of input left-eye images, and outputs a plurality of left-eye images (L1', L2', . . . ) which have undergone the image quality enhancement processing. Likewise, the right-image processing module 44 also applies various kinds of image quality enhancement processing to the plurality of input left-eye images, and outputs a plurality of left-eye images (L1', L2', . . . ) which have undergone the image quality enhancement processing.

The 3D/2D display control module 45 outputs, for example, the plurality of left-eye images (L1', L2', . . . ) which have undergone the image quality enhancement processing and are output from the left-image processing module 43, and the plurality of left-eye images (L1', L2', . . . ) which have undergone the image quality enhancement processing and are output from the right-image processing module 44. The frame-rate conversion module 46 alternately outputs the plurality of left-eye images (L1', L2', . . . ) which have undergone the image quality enhancement processing and are output from the left-image processing module 43, and the plurality of left-eye images (L1', L2', . . . ) which have undergone the image quality enhancement processing and are output from the right-image processing module 44 (L1', L1', L2', L2', . . . ).

For example, when a frame rate in a case in which the frame-rate conversion module 46 outputs only a plurality of left-eye images separated from the 3D images intact is a first frame rate (60 Hz), a frame rate upon alternately outputting the plurality of left-eye images which are separated from the 3D images and are processed by the left-image processing module 43 and those which are separated from the 3D images and are processed by the right-image processing module 44 is a second frame rate (120 Hz). That is, the frame-rate conversion module 46 can convert the first frame rate into the second frame rate (to increase the frame rate) without executing any processing such as frame interpolation.

Also, the frame-rate conversion module 46 can further increase the frame rate by inserting black images (interpolation black images) (for example, it can change the frame rate from 120 Hz to 240 Hz). Alternatively, the frame-rate conversion module 46 can further increase the frame rate by generating a plurality of frame-interpolated left-eye images based on the plurality of left-eye images (for example, it can change the frame rate from 120 Hz to 240 Hz).

The shutter glasses control module 6 sends sync signals synchronized with output timings of left-eye images to the shutter drive control module 61 of the shutter glasses. The shutter drive control module 61 opens the left-eye shutter and closes the right-eye shutter at, for example, odd left-eye image display timings, and opens the right-eye shutter and closes the left-eye shutter at even left-eye image display timings, based on the sync signals. Alternatively, the shutter glasses control module 6 sends a shutter full-open instruction, and the shutter drive control module 61 fully opens the right- and left-eye shutters based on this shutter full-open instruction.

Then, the user who wears the shutter glasses can view 2D images having no parallax while wearing the shutter glasses. That is, the image output apparatus can output images having no parallax, which are equivalent to 2D images upon input of the 2D images, by continuously outputting the left-eye images separated from the input 3D images. Furthermore, as described above, the image output apparatus outputs 2D images based on separated left-eye images which have undergone various kinds of image quality enhancement processing by both the L and right-image processing modules 43 and 44. For this reason, the image output apparatus can process right- and left-eye images at high speed, and can output high-quality 2D images equivalent to those upon inputting the 2D images. Also, the image output apparatus can switch 3D images to 2D images without switching inputs (without switching a 3D image input to a 2D image input). For this reason, the image output apparatus can quickly switch a display format from 3D images to 2D images, and can also quickly return the display format from 2D images to 3D images. This function is convenient for the user, for example, when he or she wants to temporarily confirm 2D images.

Note that the image output apparatus outputs (displays) 2D images based on left-eye images separated from the input 3D images in the above description. Alternatively, the image output apparatus can output (display) 2D images based on right-eye images separated from the input 3D images. When left-eye images and right-eye images are set in an order of a left-eye image, right-eye image, left-eye image, right-eye image, left-eye image, . . . according to the 3D image format, more efficient processing can often be done when 2D images are output (displayed) based on left-eye images separated from the 3D images.

Third Embodiment

The third embodiment will be described below with reference to FIG. 3. When 3D images are input, and a 2D image mode is designated via the operation input module 2, the control module 1 controls the 2D image processing module 3 to stop various kinds of image quality enhancement processing, and controls the 3D image processing module 4 to process the input 3D images and to display 2D images.

For example, the 3D/2D display control module 45 instructs the left/right image separation module 42 to execute separation of right- and left-eye images. As shown in FIG. 3, the left/right image separation module 42 separates a plurality of left-eye images (L1, L2, . . . ) and a plurality of right-eye images (R1, R2, . . . ) from the input 3D images (L1, R1, L2, R2, . . . ), inputs the plurality of left-eye images (L1, L2, . . . ) to the left-image processing module 43, and inputs the plurality of right-eye images (R1, R2, . . . ) to the right-image processing module 44. The left-image processing module 43 applies various kinds of image quality enhancement processing to the plurality of input left-eye images, and outputs a plurality of left-eye images (L1', L2', . . . ) which have undergone the image quality enhancement processing. The right-image processing module 44 applies various kinds of image quality enhancement processing to the plurality of input right-eye images, and outputs a plurality of right-eye images (R1', R2', . . . ) which have undergone the image quality enhancement processing.

The 3D/2D display control module 45 outputs, for example, the plurality of left-eye images (L1', L2', . . . ) which have undergone the image quality enhancement processing from an output line of a plurality of left-eye images which have undergone the image quality enhancement processing and are output from the left-image processing module 43, and also outputs the plurality of left-eye images (L1', L2', . . . ) which have undergone the image quality enhancement processing from an output line of a plurality of right-eye images which have undergone the image quality enhancement processing and are output from the right-image processing module 44. In other words, the 3D/2D display control module 45 does not output the plurality of left-eye images which have undergone the image quality enhancement processing and are output from the left-image processing module 43 and the plurality of right-eye images which have undergone the image quality enhancement processing and are output from the right-image processing module 44, but it outputs the plurality of left-eye images which have undergone the image quality enhancement processing and are output from the left-image processing module 43 intact, and outputs the plurality of left-eye images which have undergone the image quality enhancement processing in place of the plurality of right-eye images which have undergone the image quality enhancement processing and are output from the right-image processing module 44.

For example, when a frame rate in a case in which the frame-rate conversion module 46 outputs only a plurality of left-eye images separated from the 3D images intact is a first frame rate (60 Hz), a frame rate when the frame-rate conversion module 46 alternately outputs the plurality of left-eye images (L1', L2', . . . ) output from the left-eye image output line of the 3D/2D display control module 45 and those output from the right-eye image output line of the 3D/2D display control module 45 is a second frame rate (120 Hz). That is, the frame-rate conversion module 46 can convert the first frame rate into the second frame rate (to increase the frame rate) without executing any processing such as frame interpolation.

Also, the frame-rate conversion module 46 can further increase the frame rate by inserting black images (interpolation black images) (for example, it can change the frame rate from 120 Hz to 240 Hz). Alternatively, the frame-rate conversion module 46 can further increase the frame rate by generating a plurality of frame-interpolated left-eye images based on the plurality of left-eye images (for example, it can change the frame rate from 120 Hz to 240 Hz).

The shutter glasses control module 6 sends sync signals synchronized with output timings of left-eye images to the shutter drive control module 61 of the shutter glasses. The shutter drive control module 61 opens the left-eye shutter and closes the right-eye shutter at, for example, odd left-eye image display timings, and opens the right-eye shutter and closes the left-eye shutter at even left-eye image display timings, based on the sync signals. Alternatively, the shutter glasses control module 6 sends a shutter full-open instruction, and the shutter drive control module 61 fully opens the right- and left-eye shutters based on this shutter full-open instruction.

Then, the user who wears the shutter glasses can view 2D images having no parallax while wearing the shutter glasses. That is, the image output apparatus can output images having no parallax, which are equivalent to 2D images upon input of the 2D images, by continuously outputting the left-eye images separated from the input 3D images. Furthermore, as described above, the image output apparatus controls the left-image processing module 43 to apply various kinds of image quality enhancement processing to the separated left-eye images, and outputs 2D images based on the left-eye images which have undergone the image quality enhancement processing. For this reason, the image output apparatus can output high-quality 2D images equivalent to those upon inputting the 2D images. Also, the image output apparatus can switch 3D images to 2D images without switching inputs (without switching a 3D image input to a 2D image input). For this reason, the image output apparatus can quickly switch a display format from 3D images to 2D images, and can also quickly return the display format from 2D images to 3D images. This function is convenient for the user, for example, when he or she wants to temporarily confirm 2D images.

Note that the image output apparatus outputs (displays) 2D images based on left-eye images separated from the input 3D images in the above description. Alternatively, the image output apparatus can output (display) 2D images based on right-eye images separated from the input 3D images. When left-eye images and right-eye images are set in an order of a left-eye image, right-eye image, left-eye image, right-eye image, left-eye image, . . . according to the 3D image format, more efficient processing can often be done when 2D images are output (displayed) based on left-eye images separated from the 3D images.

Fourth Embodiment

Figure 4:
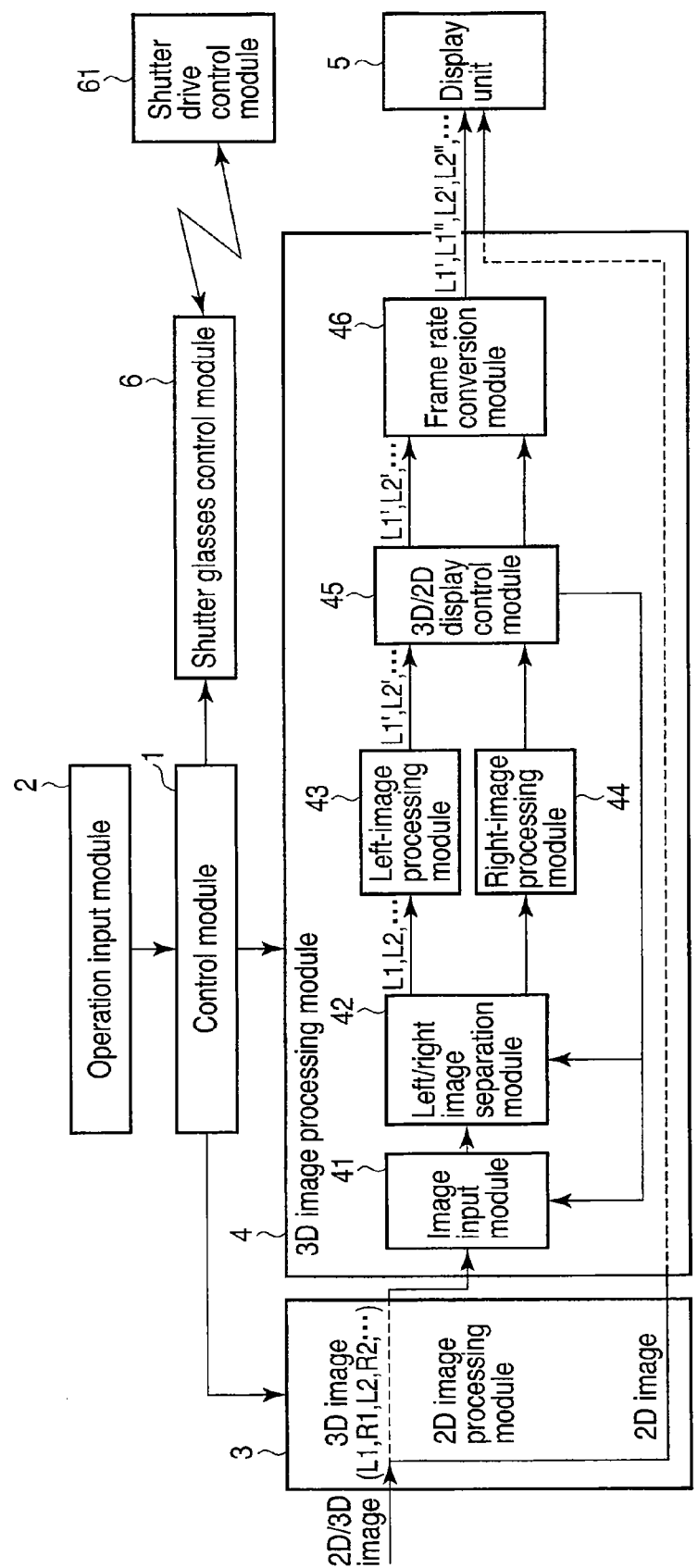
FIG. 4 is a block diagram showing an example of image output processing (2D image output processing based on input 3D images) according to the fourth embodiment.

The fourth embodiment will be described below with reference to FIG. 4. When 3D images are input, and a 2D image mode is designated via the operation input module 2, the control module 1 controls the 2D image processing module 3 to stop various kinds of image quality enhancement processing, and controls the 3D image processing module 4 to process the input 3D images and to display 2D images.

For example, the 3D/2D display control module 45 instructs the left/right image separation module 42 to execute separation of right- and left-eye images. As shown in FIG. 4, the left/right image separation module 42 separates a plurality of left-eye images (L1, L2, . . . ) and a plurality of right-eye images (R1, R2, . . . ) from the input 3D images (L1, R1, L2, R2, . . . ), and inputs the plurality of left-eye images (L1, L2, . . . ) to the left-image processing module 43. The left-image processing module 43 applies various kinds of image quality enhancement processing to the plurality of input left-eye images, and outputs a plurality of left-eye images (L1', L2', . . . ) which have undergone the image quality enhancement processing.

The 3D/2D display control module 45 outputs, for example, the plurality of left-eye images which have undergone the image quality enhancement processing and are output from the left-image processing module 43 to the frame-rate conversion module 46. The frame-rate conversion module 46 can convert a first frame rate (60 Hz) based on the left-eye images which have undergone the image quality enhancement processing into a second frame rate (120 or 240 Hz). For example, the frame-rate conversion module 46 can convert the first frame rate (60 Hz) into the second frame rate (120 or 240 Hz) by generating interpolation images (L1", L2", . . . ) from the plurality of left-eye images (L1', L2', . . . ) which have undergone the image quality enhancement processing. That is, the frame-rate conversion module 46 can increase the frame rate by alternately outputting the plurality of left-eye images (L1', L2', . . . ) which have undergone the image quality enhancement processing and interpolation images (L1", L2", . . . ) (L1', L1", L2', L2", . . . ). Also, the frame-rate conversion module 46 generates interpolation images from the left-eye images which have undergone the image quality enhancement processing, and can convert the first frame rate (60 Hz) into the second frame rate (240 Hz) based on the left-eye images, interpolation images, and also black images (interpolation black images).

Then, the user who can view 2D images having no parallax. That is, the image output apparatus can output images having no parallax, which are equivalent to 2D images upon input of the 2D images, by continuously outputting the left-eye images separated from the input 3D images. Furthermore, as described above, the image output apparatus controls the right-image processing module 44 to apply various kinds of image quality enhancement processing to the separated left-eye images, and outputs 2D images based on the left-eye images which have undergone the image quality enhancement processing. For this reason, the image output apparatus can output high-quality 2D images equivalent to those upon inputting the 2D images. Also, the image output apparatus can switch 3D images to 2D images without switching inputs (without switching a 3D image input to a 2D image input). For this reason, the image output apparatus can quickly switch a display format from 3D images to 2D images, and can also quickly return the display format from 2D images to 3D images. This function is convenient for the user, for example, when he or she wants to temporarily confirm 2D images.

Note that the image output apparatus outputs (displays) 2D images based on left-eye images separated from the input 3D images in the above description. Alternatively, the image output apparatus can output (display) 2D images based on right-eye images separated from the input 3D images. When left-eye images and right-eye images are set in an order of a left-eye image, right-eye image, left-eye image, right-eye image, left-eye image, . . . according to the 3D image format, more efficient processing can often be done when 2D images are output (displayed) based on left-eye images separated from the 3D images.

The case has been described wherein the frame-rate conversion module 46 increases the frame rate by alternately outputting the plurality of left-eye images (L1', L2', . . . ) which have undergone the image quality enhancement processing and interpolation images (L1", L2", . . . ) (L1', L1", L2', L2", . . . ). In addition, for example, the frame-rate conversion module 46 can increase the frame rate by continuously outputting interpolation images (L1", L1", L2", L2", . . . ) without using the plurality of left-eye images (L1', L2', . . . ) which have undergone the image quality enhancement processing.

FIGS. 1, 2, 3, and 4 are the block diagrams for simply explaining the 2D image processing and 3D image processing, and the circuit arrangement of the image output apparatus is not limited to the arrangement shown in FIGS. 1, 2, 3, and 4. For example, FIGS. 1, 2, 3, and 4 illustrate that the image output apparatus includes a 2D image input and 3D image input for the display unit 5. However, the circuit arrangement of the image output apparatus is not limited to this. For example, 2D images undergo various kinds of image quality enhancement processing by the 2D image processing module 3, and are input to the display unit 5 via an image output line by going through or bypassing the 3D image processing module 4. Also, 3D images go through or bypass the 2D image processing module 3, undergo various kinds of image quality enhancement processing by the 3D image processing module 4, and are input to the display unit 5 via the image output line.

Also, FIGS. 1, 2, 3, and 4 illustrate the 2D image processing module 3 and 3D image processing module 4 as independent modules. However, the circuit arrangement of the image output apparatus is not limited to this. For example, the circuit arrangement of the image output apparatus may be that in which the functions of the 2D image processing module 3 and 3D image processing module 4 are integrated, or that in which a 2D image processing function and left/right image processing function are separated.

According to at least one of all the embodiments described above, an image output apparatus and image output method which are excellent in 2D image output processing based on input 3D images can be provided.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image output apparatus comprising:
   an input module configured to input 3D images;
   a separator configured to separate a plurality of left-eye images and a plurality of right-eye images from the 3D images;
   a first image processor configured to process the plurality of left-eye images or the plurality of right-eye images;
   a second image processor configured to process the plurality of right-eye images or the plurality of left-eye images; and
   a controller configured to execute control to output the plurality of left-eye images or the plurality of right-eye images processed by at least one of the first image processor and the second image processor,
   wherein according to an instruction of a 2D image mode, the controller execute control to input the plurality of left-eye images to the first image processor and the second image processor, and execute control to output the plurality of left-eye images processed by the first image processor and the plurality of left-eye images processed by the second image processor, or according to the instruction of the 2D image mode, the controller execute control to input the plurality of right-eye images to the first image processor and the second image processor, and execute control to output the plurality of right-eye images processed by the first image processor and the plurality of right-eye images processed by the second image processor.

2. The apparatus of claim 1, wherein the controller execute control to alternately output the plurality of left-eye images processed by the first image processor, and the plurality of left-eye images processed by the second image processor, or the controller execute control to alternately output the plurality of right-eye images processed by the first image processor, and the plurality of right-eye images processed by the second image processor.

3. The apparatus of claim 1, wherein according to an instruction of a 3D image mode, the controller execute control to input the plurality of left-eye images to the first image processor and to input the plurality of right-eye images to the second image processor, and execute control to output the plurality of left-eye images processed by the first image processor and the plurality of right-eye images processed by the second image processor.

4. The apparatus of claim 1, further comprising:
a display configured to display 2D images based on the plurality of left-eye images or the plurality of right-eye images.

5. An image output method comprising:
inputting 3D images;
separating a plurality of left-eye images and a plurality of right-eye images from the 3D images; and
executing control to output the plurality of left-eye images processed by at least one of a first image processor which processes the plurality of left-eye images or the plurality of right-eye images and a second image processor which processes the plurality of right-eye images or the plurality of left-eye images, or the plurality of right-eye images processed by at least one of the first image processor and the second image processor,
wherein the executing comprises executing control to input the plurality of left-eye images to the first image processor and the second image processor according to an instruction of a 2D image mode, and executing control to output the plurality of left-eye images processed by the first image processor and the plurality of left-eye images processed by the second image processor, or the executing comprises executing control to input the plurality of right-eye images to the first image processor and the second image processor according to the instruction of the 2D image mode, and executing control to output the plurality of right-eye images processed by the first image processor and the plurality of right-eye images processed by the second image processor.

6. The apparatus of claim 2, wherein according to an instruction of a 3D image mode, the controller execute control to input the plurality of left-eye images to the first image processor and to input the plurality of right-eye images to the second image processor, and execute control to output the plurality of left-eye images processed by the first image processor and the plurality of right-eye images processed by the second image processor.

7. The apparatus of claim 2, further comprising:
a display configured to display 2D images based on the plurality of left-eye images or the plurality of right-eye images.

8. The apparatus of claim 3, further comprising:
a display configured to display 2D images based on the plurality of left-eye images or the plurality of right-eye images.

* * * * *